US012451988B2

(12) United States Patent
Hou et al.

(10) Patent No.: US 12,451,988 B2
(45) Date of Patent: Oct. 21, 2025

(54) INTERFERENCE AND JAMMER CANCELLATION FOR RADIOS

(71) Applicant: Viasat Inc., Carlsbad, CA (US)

(72) Inventors: Jason Hou, Carlsbad, CA (US); James Christopher Kirsch, San Diego, CA (US)

(73) Assignee: Viasat, Inc., Carlsbad, CA (US)

( * ) Notice: Subject to any disclaimer, the term of this patent is extended or adjusted under 35 U.S.C. 154(b) by 405 days.

(21) Appl. No.: 18/075,541

(22) Filed: Dec. 6, 2022

(65) Prior Publication Data
US 2023/0101372 A1 Mar. 30, 2023

Related U.S. Application Data

(63) Continuation of application No. PCT/US2021/035321, filed on Jun. 1, 2021.
(Continued)

(51) Int. Cl.
H04K 3/00 (2006.01)
(52) U.S. Cl.
CPC ......... H04K 3/228 (2013.01); H04K 2203/32 (2013.01)
(58) Field of Classification Search
CPC .. H04K 1/00; H04K 3/20; H04K 3/22; H04K 3/222; H04K 3/228; H04K 3/28;
(Continued)

(56) References Cited

U.S. PATENT DOCUMENTS 4,575,724 A  3/1986 Wiener
8,301,075 B2 * 10/2012 Sherman .............. H04B 1/1036
455/67.11

(Continued)

FOREIGN PATENT DOCUMENTS

CN  104378320  2/2015

OTHER PUBLICATIONS

Lai et al., "Space-time Interference Suppression Technology Based on Sub-band Blind Adaptive Array Processing", National Natural Science Foundation of China, ISBN, 978-I-4799-4808-6, 2014 IEEE, 5 pages.

(Continued)

Primary Examiner — Tuan Pham
(74) Attorney, Agent, or Firm — Holland & Hart LLP

(57) ABSTRACT

Methods, systems, and devices for reducing the impact of a jamming signal on wireless communications are described. Generally, the described techniques provide for receiving a first signal at a first antenna and receiving a second signal at a second antenna. An anti-jammer manager may process the first signal and the second signal to obtain a residual signal. The processing may include determining a weighting factor based at least in part on a correlation between the first signal and the second signal, applying the weighting factor to the first signal to create a weighted first signal, and subtracting the weighted first signal from the second signal to obtain the residual signal. A demodulator may demodulate the residual signal to obtain symbol information. A decoder may decode the symbol information to obtain data. The techniques may be used to recover a desired signal portion from a jammed signal.

37 Claims, 10 Drawing Sheets

Related U.S. Application Data

(60) Provisional application No. 63/036,912, filed on Jun. 9, 2020.

(58) Field of Classification Search
CPC ............ H04K 3/40; H04K 3/80; H04K 3/822; H04K 2203/32; H04K 2203/36
See application file for complete search history.

(56) References Cited

U.S. PATENT DOCUMENTS

| | | | |
|---|---|---|---|
| 9,519,062 B2 | 12/2016 | Vosburgh et al. | |
| 9,778,367 B2* | 10/2017 | Wang | G01S 19/21 |
| 2006/0188033 A1* | 8/2006 | Zehavi | H04K 3/228 |
| | | | 375/260 |
| 2009/0103720 A1 | 4/2009 | Narayanan | |
| 2013/0308732 A1 | 11/2013 | Kpodzo et al. | |
| 2019/0363820 A1 | 11/2019 | Zeng | |

OTHER PUBLICATIONS

International Search Report and Written Opinion, PCT/US2021/035321 dated Apr. 8, 2022, 11 pages.

\* cited by examiner

INTERFERENCE AND JAMMER CANCELLATION FOR RADIOS

CROSS REFERENCE

The present application for patent is a Continuation of International PCT Application No. PCT/US2021/035321 by HOU et al, entitled "INTERFERENCE AND JAMMER CANCELLATION FOR RADIOS" filed Jun. 1, 2021, which claims the benefit of U.S. Provisional Patent Application No. 63/036,912 by HOU et al., entitled "INTERFERENCE AND JAMMER CANCELLATION FOR RADIOS," filed Jun. 9, 2020, each of which are assigned to the assignee hereof, and each of which are expressly incorporated by reference in its entirety herein.

BACKGROUND

The following relates generally to wireless communications, and more specifically to extracting a desired signal from a jammed signal.

Wired and wireless communications systems are widely deployed to provide various types of communication content such as voice, video, packet data, messaging, broadcast, and so on. Some communications systems may be used in the context of secure communications, such as tactical communications. In addition, some communication systems may experience interference from various sources including hostile jamming intended to disrupt communication signaling. Such communications systems may be subject to various constraints and challenges.

SUMMARY

The described techniques relate to improved methods, systems, devices, and apparatuses that mitigate interference including hostile jamming. Generally, the described techniques provide for decorrelating a jamming signal from a signal received at two or more spatially diverse antennas in order to recover a desired signal. The described techniques may include techniques for receiving a first signal at a first antenna and receiving a second signal at a second antenna. The described techniques may also include techniques for processing the first signal and the second signal to obtain a residual signal, wherein the processing includes determining a weighting factor based at least in part on a correlation between the first signal and the second signal, applying the weighting factor to the first signal to create a weighted first signal, and subtracting the weighted first signal from the second signal to obtain the residual signal. The described techniques may include techniques for demodulating the residual signal to obtain symbol information and decoding the symbol information to obtain data.

DETAILED DESCRIPTION

Figure 1:
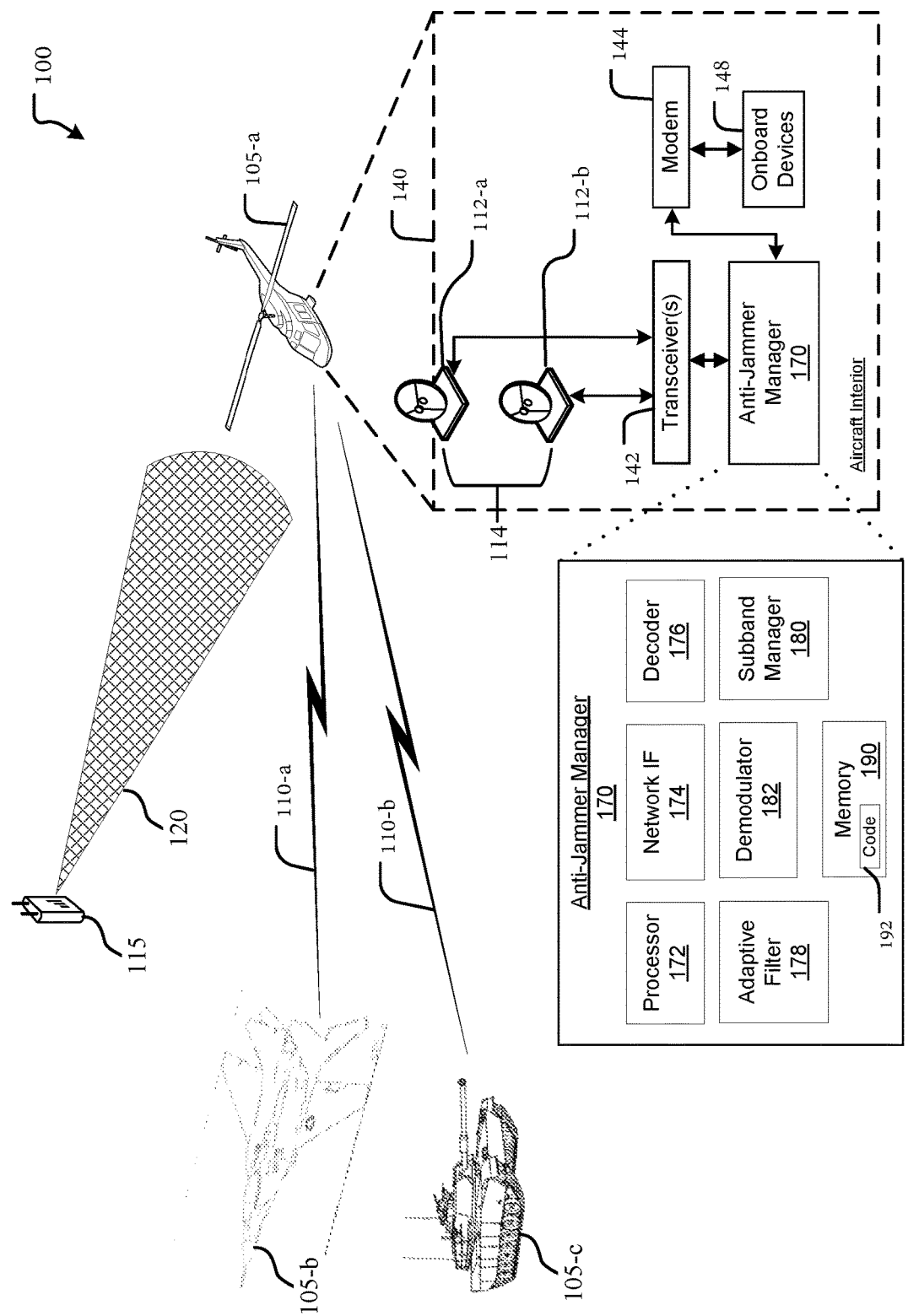
FIG. 1 illustrates an example of a communication system that supports interference and jammer cancellation for radios in accordance with aspects of the present disclosure.

Wireless communications systems used for secure communications, such as for tactical communications between military entities, may be subject to interference or attempts to jam the communication channels. For example, such communications may be expected to provide a high level of robustness to external tampering, a high level of reliability, etc. In some instances, especially in military applications, a hostile jammer may transmit a strong signal in order to degrade communications. Techniques described herein provide mitigation for jamming signals. An anti-jammer device may be used in conjunction with spatially diverse antennas to extract a jamming signal from two copies of a received signal, leaving behind a residual signal. The intended or desired signal may then be extracted from the residual signal.

Techniques described herein do not need to have any prior knowledge about the jamming signal, and yet can identify and extract it. The anti-jammer device actively removes a common correlated signal between two received signals at two spatially diverse antennas. The diversity allows the signal to come out of the two antennas in a decorrelated way. This presents an opportunity to determine information about the jammer, because the time of arrival for the signal at the two antennas is slightly different. Exploiting this difference enables the jamming signal to be identified and removed. By removing the correlated jamming signal, the desired signal can be found.

The anti-jammer manager may split the received signals into sub-bands in order to aid detection of the correlated signals. The anti-jammer manager may input the split signals into a blind adaptive canceller (BAC) for each sub-band. The BAC may determine the correlated signal without using a training sequence or a reference signal. Instead, one of the received signals is used as a reference signal and the other is used as a degraded received signal. By treating the signals in this way, the output of the BAC may be a degraded signal that does not include a common noise. In some examples, the BAC may use an adaptive filter to detect the correlated signal, but analytical techniques are described that do not use the adaptive filter. An adaptive filter may be used to automatically track changes in the received signals (e.g., amplitude, phase, and time-of-arrival, etc.) as a device that includes the anti-jammer manager (such as an aircraft) changes position.

Although the discussion herein focuses on wireless communications using, for example, tactical data links, such techniques may also be used for other wireless or wireline communications. For example, various wireless or wireline communication environments may experience interference (e.g., due to multipath, competing device transmissions, or noise, for example). Moreover, such techniques may be applied to other types of signals that are transmitted and received, such as radar signals and sonar signals, and may be used in applications such as in hearing aids.

Aspects of the disclosure are initially described in the context of a wireless communications system. Aspects of the disclosure are further illustrated by and described with reference to apparatus diagrams, system diagrams, and flowcharts that relate to anti-jamming for interference and jammer cancellation.

FIG. 1 illustrates an example of a communication system 100 that supports interference and jammer cancellation for radios in accordance with aspects of the present disclosure. Communication system 100 includes devices 105-a, 105-b, and 105-c (collectively referred to herein as devices 105) that may be capable of wireless communication using a tactical data link 110-a or 110-b (collectively referred to herein as tactical data link 110). Devices 105 may be a handheld device carried by a user, a satellite, or may be located in a vehicle such as aircraft, tank, ship, or other type of vehicle. Tactical data link 110 may support secure communications between devices 105 and may include anti-jamming capabilities. Anti-jamming may refer to reducing or cancelling the impact of an interference or jamming signal. A jamming signal may be any signal that interferes with the reception of a desired signal.

For example, a device 115 may transmit a jamming signal 120 to disrupt communications for one or more devices 105, such as device 105-a as shown in FIG. 1. A device 115 may be a handheld device carried by a user, may be located in a vehicle such as aircraft, tank, ship or other type of vehicle, a satellite, or may be a stationary device such as a radio antenna. The jamming signal 120 may be a very strong signal that is transmitted to intentionally interfere with successful communications between devices 105. In other examples, the jamming signal 120 is an interference signal transmitted without intent to jam communications of the devices 105 (e.g., a strong communication signal used by other devices).

The device 105-a may include communication equipment 140 that may include two or more antennas 112-a and 112-b (collectively referred to as antennas 112), one or more transceivers 142, an anti-jammer manager 170, a modem 144 (which may be, be part of, or include aspects of a single-user or multi-user access terminal), and one or more onboard devices 148.

The antennas 112 may be satellite terminals or radio antennas, for example, and may include one or more mobile terminal antennas. The antennas 112 may be separated from each other by a distance 114. The distance 114 may be greater than one wavelength of signals sent over the tactical data link 110, for example. In some examples, the antennas 112 may be mounted on opposite sides of the device 105-a. In some examples, the antennas 112 are mounted on the device 105-a in such a way as to maximize the distance 114. In an example where the device 105-a is an aircraft, the first antenna 112-a may be mounted on the top or a first side of the fuselage and the second antenna 112-b may be mounted on a bottom or a second side of the fuselage. This positioning can aid with anti jamming of global navigation satellite system (GNSS), such as Global Positioning System (GPS), signals.

The communication equipment 140 may provide communication services for one or more onboard devices 148 via the modem 212. The communication equipment 140 may have Concurrent Multi-Net (CMN) or Concurrent Contention Receive (CCR) capability, which are examples of tactical data link capabilities. The communication equipment 140 may support one or more examples of CMN or CCR such as CMN-4 or CCR-4. The onboard devices 148 may be mobile or other devices within the device 105-a and may use a wired or a wireless connection (a wireless connection may be, for example, of a wireless local area network (WLAN) technology such as IEEE 802.11 (Wi-Fi), or other wireless communication technology). The onboard device 148 may be related to mobility of the device 105-a or to a mission of the device 105-a, for example.

The communication equipment 140 may also include circuits and/or one or more processors 172 for processing (e.g., performing frequency conversion, modulating/demodulating, multiplexing/demultiplexing, filtering, forwarding, etc.) RF communication signals (e.g., signals over tactical data links 110). Such circuits and/or processors 172 may be included in an antenna communication assembly, which may be mounted internally or externally to a body or fuselage of the vehicle or aircraft represented by device 105-a. Additionally or alternatively, the transceiver 142 may include circuits and/or processors for performing various RF signal operations (e.g., receiving, performing frequency conversion, modulating/demodulating, multiplexing/demultiplexing, etc.).

The anti-jammer manager 170 may be located on-board the device 105-a and may include one or more processors 172, a network interface (IF) 174, and a memory 190. The processor 172 may execute instructions stored on the memory 192 to perform the functions of the anti-jammer manager 170. The memory 192 may store the instructions for the operation of the anti-jammer manager 170, adaptive filter tap weights, and may also store executable code.

The anti-jammer manager 170 may further include, for example, a decoder 176, an adaptive filter 178, a demodulator 182, and a sub-band manager 180. The anti-jammer manager 170 may apply techniques described herein to cancel a jamming signal 120 from desired signals over tactical data links 110. For example, the anti-jammer manager 170 may explore correlation of received signals from the multiple antennas 112 that may be imposed by interferers and hostile jammers. The anti-jammer manager 170 may actively de-correlate common radio frequency (RF) signals present at the antennas 112 in time periods that are mostly free of desired signals, and may produce de-correlated outputs to the demodulator 182. By doing so, the anti-jammer manager 170 removes signals from strong interference or jammers, yielding desired signals that are hidden away in the residual signals.

The sub-band manager 180 may spectrally split one or more signals received at the antennas 112 into a plurality of sub-bands of a given bandwidth. For example, the sub-band manager 180 may split a 150 MHz communication frequency band into 3 or 4 sub-bands. The sub-bands may allow the correlation to be detected more easily. For example, each sub-band may be considered to have flat fading. In some examples, the bandwidth of the sub-band is based at least in part on a time-of-arrival of the received signals. However, the bandwidth of the sub-band may also be based on a particular installation of the diverse antennas 112.

The adaptive filter 178 may use filter tap weights, determined as described herein, to process the signals to create a weighted signal. A plurality of adaptive filter tap weights of the adaptive filter 178 may be tracked based on a minimization function of a residual signal. The adaptive filter tap weights may be stored temporarily or permanently in the memory 190. The demodulator 182 may demodulate the residual signal obtained by the adaptive filter 178 to obtain symbol information. The decoder may decode the symbol data to obtain data.

According to various aspects, the anti-jammer manager 170 provides anti-jamming techniques using a blind cancellation anti-jam (BCAJ) algorithm. The anti-jamming techniques may be beneficial to all radios that employ multiple antennas and frequencies targeted by hostile jammers, such as military radios. The anti-jamming techniques may be utilized with different existing radio architectures. The anti-jammer manager 170 may also provide GPS anti-spoofing capabilities where large jammers (e.g., jammers whose signal strengths are greater than strengths of the desired signals) can be isolated from weak desired signals. The techniques described herein may improve anti jamming performance, improve throughput, and/or provided better spectrum efficiency. For example, the techniques described herein may mitigate the effect of channel jamming and therefore improve transmission quality and throughput.

Figure 2:
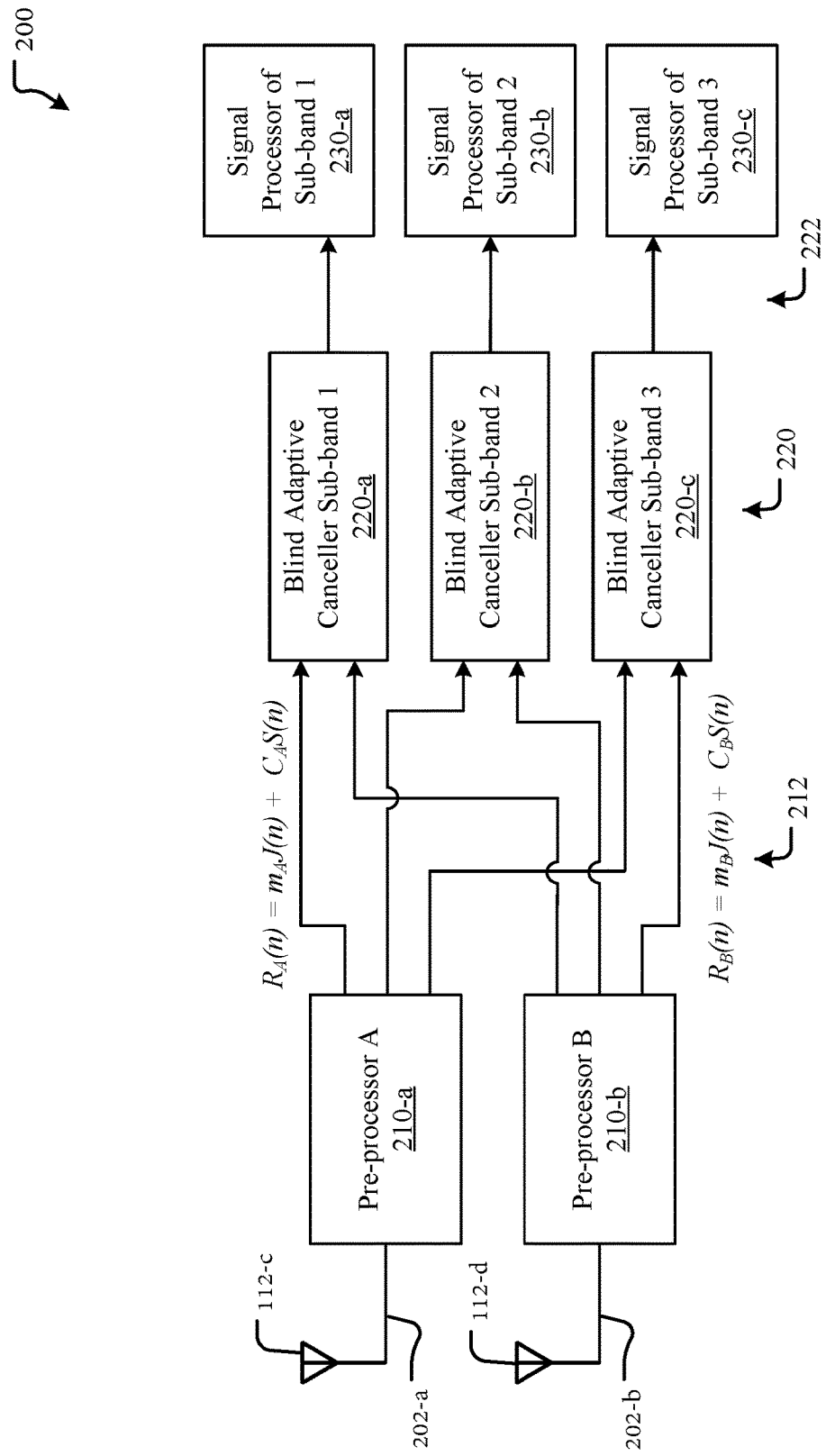
FIG. 2 illustrates an example of a communication device that supports interference and jammer cancellation for radios in accordance with aspects of the present disclosure.

FIG. 2 illustrates an example of a communication device 200 that supports interference and jammer cancellation for radios in accordance with aspects of the present disclosure. In some examples, the communication device 200 may be included in a wireless communication system, such as wireless communication system 100. The communication device 200 may be or include one or more aspects of the anti-jammer manager 170 of FIG. 1.

The communication device 200 may include two antennas 112-$c$ and 112-$d$ (collectively referred to herein as antennas 112), which may be examples of the antennas 112 of FIG. 1. The first antenna 112-$c$ (antenna A) receives a first signal 202-$a$ and the second antenna 112-$d$ (antenna B) receives a second signal 202-$b$. The first signal 202-$a$ and the second signal 202-$b$ (collectively referred to herein as incoming signals 202) are provided to a first pre-processor 210-$a$ and a second pre-processor 210-$b$ (collectively referred to herein as pre-processors 210). The pre-processors 210 may be an example of one or more aspects of sub-band manager 180 of FIG. 1. There may be a pre-processor 210 for each antenna 112.

The pre-processors 210 may spectrally split the incoming signals 202 into a plurality of sub-bands (e.g., into n sub-bands, wherein n is a positive integer). The bandwidth of the sub-bands may be the same or different. By sub-banding, reaction of the anti-jammer techniques are localized to a limited RF passband, which further improves the flexibility of the anti-jammer performance. The pre-processors 210 may output split signals 212. The example of FIG. 2 shows three sub-bands used, however more or fewer sub-bands may be used according to various examples. Digital receivers may be used for the implementation of the BCAJ algorithm and signal computation may be carried out in one or more field programmable gate array (FPGA) digital devices. The split signals 212 may be digitized samples that are on each sub-band n. That is, each pre-processor 210 may convert the incoming signals 202 to digital signals (e.g., via an analog-to-digital converter), divide the signal R from its antenna 112 into sub-bands, and output digitized IQ streams of samples of the portion of the signal R on each sub-band.

For each RF sub-band, after down conversion and signal sampling, the digital baseband signal can be expressed as discrete complex variables, as given in Equations (1) and (2):

$$R_{AntA}(n) = m_A J(n) + c_A S(n) + v_A(n) \quad (1)$$

$$R_{AntB}(n) = m_B J(n) + c_B S(n) + v_B(n) \quad (2)$$

where $R_{AntA}(n)$ and $R_{AntB}(n)$ are digitized received signals of the first antenna 112-$c$ and the second antenna 112-$d$ in the particular sub-band (n), respectively, J (n) is the interferer or jammer signal, S (n) is the signal of interest, and $v_A(n)$ and $v_B(n)$ are radio circuit noise attributed to the antenna 112 chains. Due to widely separated antennas and different arriving angles of incoming signals 202, the jammer and desired signal strengths and the RF phases are statistically independent. Complex amplitudes of these components can be expressed as complex gain terms $m_A$, $m_B$, $c_A$, and $c_B$.

The split signals 212 from each antenna radio chain for a given sub-band may be inputted into the blind adaptive canceller (BAC) 220 for that sub-band. In the example shown in FIG. 2, BAC 220-$a$ corresponds to a first sub-band 1, BAC 220-$b$ corresponds to a second sub-band 2, and a BAC 220-$c$ corresponds to a third sub-band 3. Without knowing the signal characteristics of the jammer, the BACs 220 can remove common jammer signals that are present on both antennas 112 (thus, the techniques may be referred to as blind cancellation). If jammer complex gain terms on the two antennas 112 can be satisfactorily estimated, the output of the BCAJ can be expressed as Equation (3):

$$BC(n) = R_{AntA}(n) - \beta R_{AntB}(n) \quad (3)$$

where the $\beta$ factor is a self-canceling feedback factor between the two antenna signals 202. Note that J(n), S(n), and v(n) are statistically independent and J(n) may be assumed unknown a-priori.

To remove the unknown jammer J(n), a $\beta$ factor is given as Equation (4):

$$\beta = \frac{m_A}{m_B} \quad (4)$$

The BCAJ output may then be given as Equations (5) and (6):

$$BC(n) = R_{AntA}(n) - \frac{m_A}{m_B} R_{AntB}(n) \quad (5)$$

$$BC(n) = c_B \left( \frac{c_A}{c_B} - \frac{m_A}{m_B} \right) S(n) + v_A - \frac{m_A}{m_B} v_B \quad (6)$$

When jammers and the source of desired transmitters are randomly and spatially located for two receive antennas 112 that are widely separated by greater than one RF wavelength, the jammer-to-signal ratio is likely different on the two antennas 112. This leads to the observation that term $$\left( \frac{c_A}{c_B} - \frac{m_A}{m_B} \right)$$

in Equation (6) will be non-zeros. For wideband communication systems such as Link-16 that has 51 operation frequency channels, it is even less likely that all 51 channels can be degraded with zero amplitude. One exception may be when the jammers and desired transmitters are collocated in the same spatial location. In such a rare instance, the BCAJ may not be able to differentiate between the jammer and the desired signal when the jammer signal characteristics are unknown.

The anti-jammer techniques also satisfactorily estimate the β factor dynamically and accurately with minimum impact from desired signals.

To computationally estimate β factor in real time, the baseband receiver can perform block analysis of receive samples. On standardized radio communication systems, the receiver can locate time periods with the least likelihood of desired receive signals. In durations when desired receive signals are weak or not present, the receiver can compute cross correlation and autocorrelation of dual-antenna signals, given as Equations (7) and (8):

$$X_{cross}=E\{R^*_{AntB}(n)R^*_{AntA}(n)\}=m_B m_A^* E\{J(n)J^*(n)\}+ c_B c_A^* E\{S(n)S^*(n)\} \quad (7)$$

$$XA_{auto}=E\{R_{AntA}(n)R^*_{AntA}(n)\}=m_A m_A^* E\{J(n)J^*(n)\}+ c_A c_A^* E\{S(n)S^*(n)\} \quad (8)$$

where the function E is a statistical estimate of the mean value.

Digital estimators for the cross and auto-correlation can be implemented as Equations (9) and (10):

$$\hat{X}_{cross} = \frac{1}{N}\sum_{n=0}^{N-1}\{R_{AntB}(n)R^*_{AntA}(n)\} \approx m_B m_A^* P_J + m_B m_A^* P_S \quad (9)$$

$$\hat{X}_{auto\_A} = \frac{1}{N}\sum_{n=0}^{N-1}\{R_{AntA}(n)R^*_{AntA}(n)\} \approx |m_A|^2 P_J + |c_A|^2 P_S + P_{NA} \quad (10)$$

where $P_J$ is the jammer power, $P_S$ is the desired signal power, and PNA is the receiver circuit noise power of path of the first antenna 112-c. This may assume that the jammer strength $P_J$ far exceeds $P_S$ and PNA at the time period when β factor is computed.

The β factor estimator can be derived based on ratio of auto and cross correlation, as given in Equations (11) through (13):

$$\hat{X}_{cross} = \frac{1}{N}\sum_{n=0}^{N-1}\{R_{AntB}(n)R^*_{AntA}(n)\} \approx m_B m_A^* P_J + m_B m_A^* P_S \quad (11)$$

$$\hat{X}_{auto\_A} = \frac{1}{N}\sum_{n=0}^{N-1}\{R_{AntA}(n)R^*_{AntA}(n)\} \approx |m_A|^2 P_J + |c_A|^2 P_S + P_{NA} \quad (12)$$

$$\hat{\beta} = \frac{\hat{X}_{auto\_A}}{\hat{X}_{cross}} \approx \frac{m_A}{m_B} \quad (13)$$

Note that this block-based method may perform complex division of numbers. An alternative, an adaptive least means square (LMS) algorithm that dynamically tracks the feedback factor, is described below with respect to FIG. 3.

After this example processing at the BACs 220, the processed signals 222 are provided to a series of signal processors 230-a, 230-b, and 230-c (referred to herein as signal processors 230), for further processing (e.g., demodulating and decoding an expected or desired signal).

Figure 3:
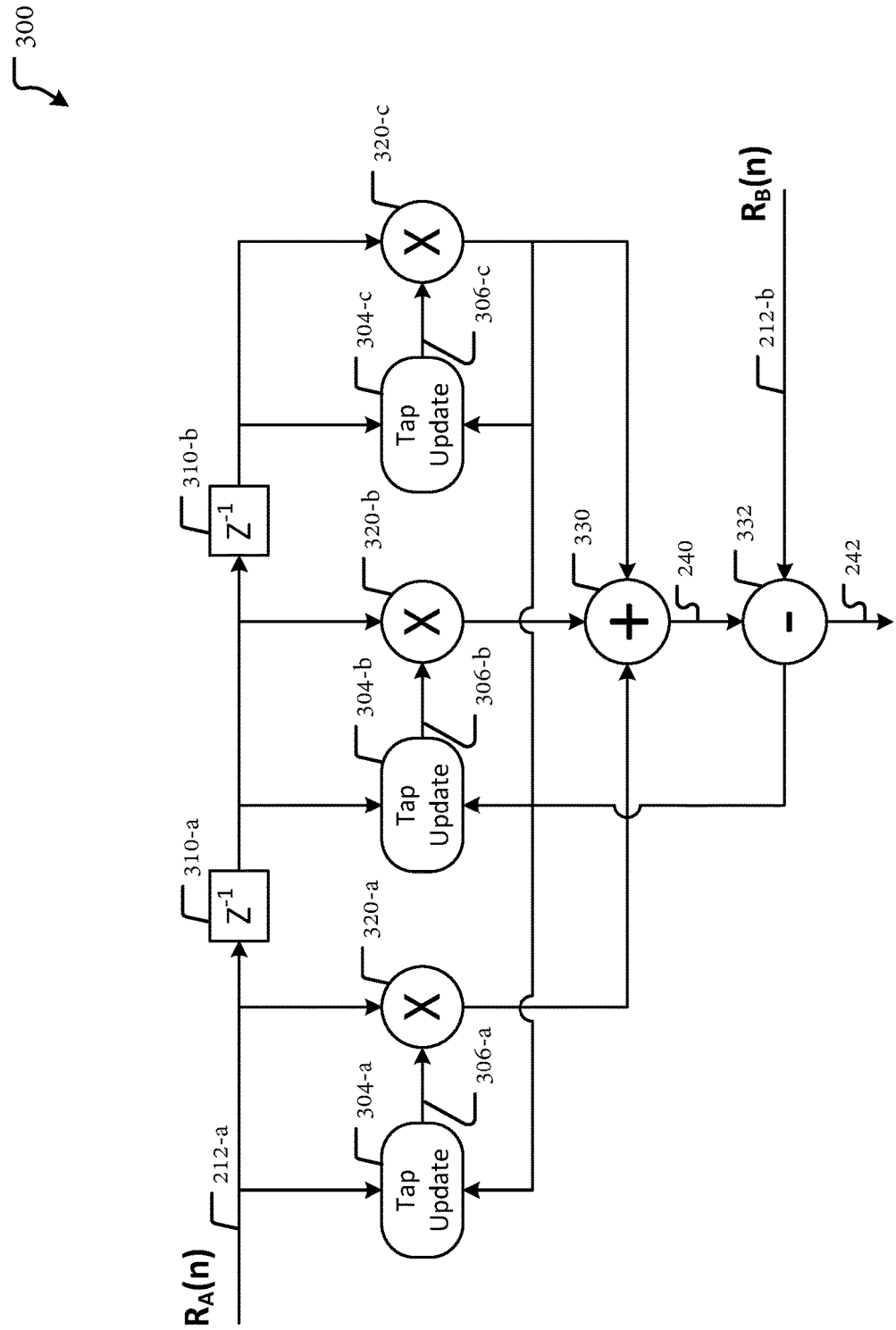
FIG. 3 illustrates an example of an adaptive filter that supports interference and jammer cancellation for radios in accordance with aspects of the present disclosure.

FIG. 3 illustrates an example of an adaptive filter 300 that supports interference and jammer cancellation for radios in accordance with aspects of the present disclosure. In some examples, the adaptive filter 300 may implement aspects of the BACs 220 of FIG. 2, the anti-jammer manager 170 of FIG. 1, and the adaptive filter 178 of FIG. 1. FIG. 3 shows an example digital structure of a 3-tap LMS filter.

The adaptive filter 300 may include tap delay elements 310-a and 310-b (collectively referred to herein as tap delay elements 310), tap updates 304-a through 304-c (collectively referred to herein as tap updates 304), multipliers 320-a through 320-c (collectively referred to herein as multipliers 320), an adder 330 and a subtractor 332. Inputs to the adaptive filter 300 are $R_A$ (n), which is the received signal 212-a from the first antenna which has been split into a sub-band n, and $R_B$(n), which is the received signal 212-b from the second antenna which has been split into the same sub-band n. The tap updates 304 may apply the weighting/tap factor to the signals to create weighted signals 306-a through 306-c.

In a dynamic environment, the β factor may vary with time. The block-based method described above with respect to FIG. 2 may have difficulty keeping up with the time variation. Equations (14)-(19) describe an LMS algorithm that is used. The BCAJ may utilize LMS tracking of a dynamic jammer without the aid of counter-intelligence.

$$x(n)=[x(n),x(n-1), \ldots , x(n-p+1)]^T \quad (14)$$

$$w(n)=[w_0(n),w_1(n), \ldots , w_{p-1}(n)]^T \quad (15)$$

$$y(n)=w^H(n)\cdot x(n) \quad (16)$$

$$d(n)=y(n)+v(n) \quad (17)$$

$$e(n)=d(n)-\hat{y}(n)=d(n)-\hat{w}^H(n)\cdot x(n) \quad (18)$$

$$\hat{w}(n+1)=\hat{w}(n)+\mu x(n)e^*(n) \quad (19)$$

Here x(n) is the received RF complex baseband signal, w(n) is the adaptive filter tap weights of $p^{th}$ order finite impulse response (FIR), y(n) is the output of the LMS adaptive filter, d(n) is the desired signal populated with the jammer reference signal to be removed, v(n) is the white circuit noise, e(n) is the residual signal with jammer removed, and μ is the step-size of LMS update.

In BCAJ, jammer characteristics may be unknown and there may be no a-priori d(n) to be used as a training sequence. Instead, when applying the LMS adaptive filter 300 onto BCAJ jammer cancellation, the signal received at the first antenna, $R_A$(n), may be selected as the desired (or reference) signal. The signal received at the second antenna, $R_B$(n), may be sent to the receive port. Equation (20) shows the desired and jammer signal:

$$d(n)=R_{AntA}(n) \text{ and } x(n)=R_{AntB}(n) \quad (20)$$

When the source of a jammer interferer is at a far distance, with or without multipath impairment, J(n) has identical signal characteristics on both antennas. A single-tap adaptive filter (p=1) can be used to track the β factor. In practice, widely separated dual antennas can incur a difference of arrival time or receive RF antenna paths can have delay skew. A three-tap complex LMS adaptive filter may be used to robustly fight against skew of RF path delays of the two antennas.

The adaptive LMS filter 300 may produce de-correlated residual outputs in mean square sense such that residual signals e(n) have no correlated component of x(n). The adaptation rule of tap weights on Equation (19) indicates that any correlated result between x(n) and e(n) results in feedback update of tap weight w(n). In other words, the BCAJ, when employing the adaptive LMS filter 300, may produce residual outputs that reduce mean square errors of any common signals between the first and second antennas. When jammers are strong, residual signals contain desired signals that are less impacted by the BCAJ 3-tap FIR operation.

The signal 240 that is output at the adder 330 is the correlated signal. The signal output 242 at the subtractor 332 is the residual signal. The residual signal may be the desired signal.

In some examples, leaky LMS may be used for dynamic tracking, for example, when the jammer amplitude diminishes or vanishes. Because the tap weight update in the LMS algorithm is based on the strength of the correlation of the residual errors, if the jammer reference is weakened or removed, the tap updates 304 may be slowed. Equation (19) points out that when x(n) is abruptly void of jammers, the results of the correlation is a white Gaussian process. The adaptive tap filter 300 may have difficulty returning to a zero state.

To adequately track the dynamic nature of the hostile jammer during aircraft maneuvering, the tap weight update 304 may incorporate a leaky response so the tap weights can vary sufficiently during a high aircraft maneuver. The leaky LMS tap weight update is modified according to Equation (21):

$$\hat{w}(n+1) = \hat{w}(n) - \xi \cdot \text{sign}(\hat{w}(n)) + \mu x(n) e^*(n) \quad (21)$$

The tap weight update decays when the BC output is not correlated with the receiver input, which allows the tap weights to retrain upon changes in jammer characteristics.

Another example provides unconditional LMS convergence. As with conventional LMS algorithms, the tap weight settling time may be dependent on the received signal amplitude. At signals with high amplitudes, tap weight updates can diverge, causing the LMS algorithm to run away. For BCAJ, divergence can be exacerbated due to the fact that desired sequence d(n) is fed with the first antenna signal and not with a known training sequence. The squaring operation may cause the amplitude to grow faster than in conventional LMS algorithms. Step-size updates can overwhelm the tap weight updates, causing the LMS algorithm to diverge.

Saturating the tap weight update magnitude effectively limits the size of step update of tap weights and can overcome the LMS divergence problem. The saturated tap weight updates can be given as Equation (22):

$$\hat{w}(n+1) = \hat{w}(n) - \xi \cdot \text{sign}(\hat{w}(n)) + \mu \cdot \text{Sat}\{x(n) e^*(n)\} \quad (22)$$

By limiting and saturating the results of the cross correlation computation of x(n) and e(n), the step-size accumulation is limited to a manageable rate, thereby guaranteeing unconditional stability of the LMS algorithm.

Figure 4:
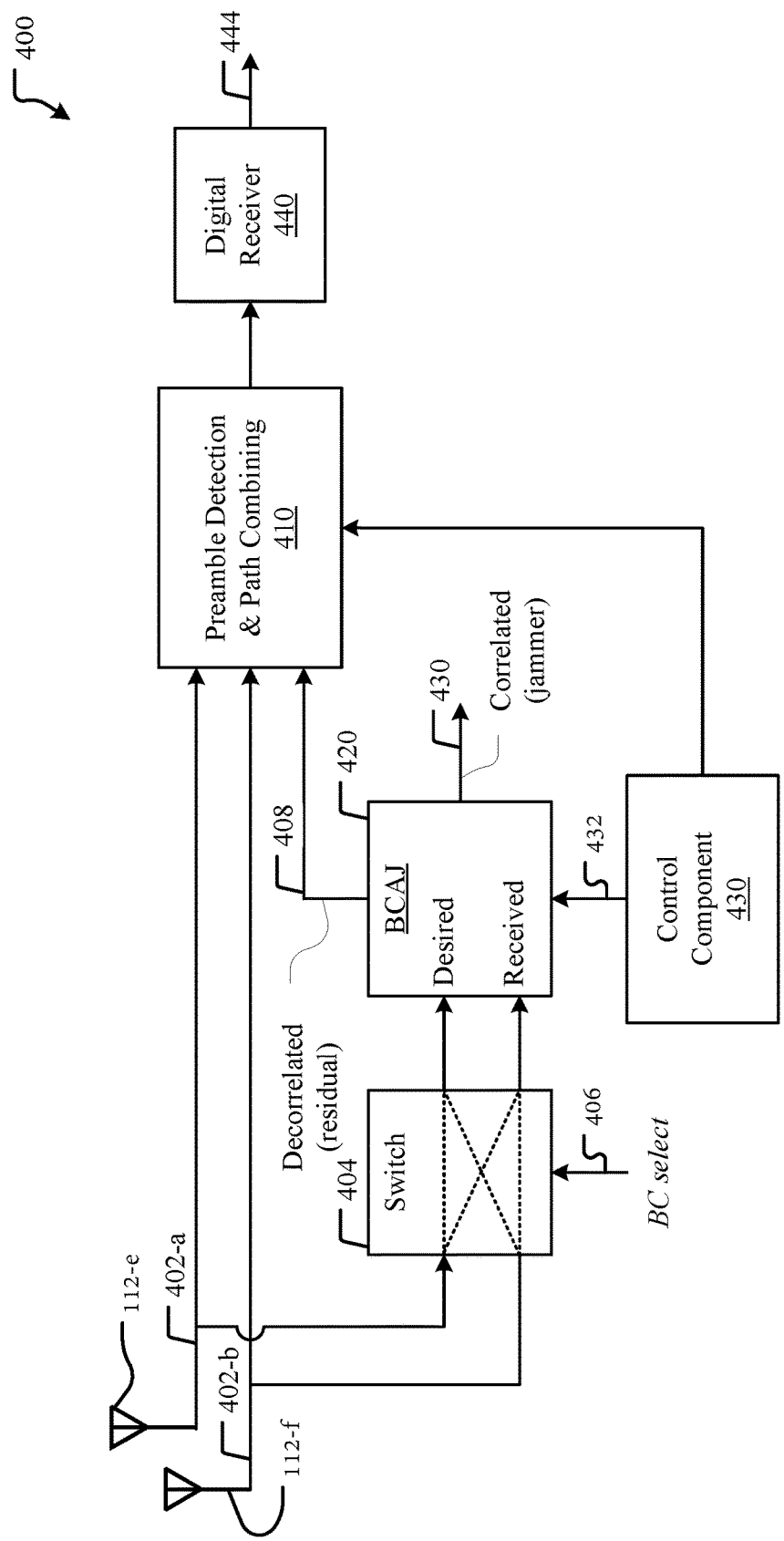
FIG. 4 illustrates an example of an anti-jammer manager that supports interference and jammer cancellation for radios in accordance with aspects of the present disclosure.

FIG. 4 illustrates another example of an anti-jammer 400 that supports interference and jammer cancellation for radios in accordance with aspects of the present disclosure. In some examples, the anti-jammer 400 may implement aspects of the BACs 220 of FIG. 2, the anti-jammer manager 170 of FIG. 1, and the adaptive filter 300 of FIG. 3. FIG. 3 shows an example digital structure of a 3-tap LMS filter. FIG. 4 shows a top-level instantiation of a BCAJ 420 in an example digital receiver.

The anti-jammer 400 may include two antennas 112-e and 112-f, which may be examples of the antennas 112 of FIGS. 1 and 2. The first antenna 112-e (antenna A) receives a first signal 402-a and the second antenna 112-f (antenna B) receives a second signal 402-b. The first signal 402-a is input to a preamble detection and path combining component 410 and to a switch 404. The second signal 402-b is also input to the preamble detection and path combining component 410 and the switch 404.

A BC select signal 406 is input to the switch 404. The BC select signal 406 controls the switch 404 to assign the signals 402-a and 402-b to the inputs (e.g., the desired and received signal inputs) of the BCAJ 420. For example, in a first state the switch 404 may provide signal 402-a to the desired (or reference) input and signal 402-b to the received input of the BCAJ 420. In a second state, the switch 404 may provide signal 402-a to the received input and signal 402-b to the desired (or reference) input of the BCAJ 420. The BCAJ 420 may perform techniques as described herein for determining the correlated jammer signal 430 and extracting the residual signal 408. The BCAJ 420 outputs the residual signal 408, which is input to the preamble detection and path combining component 410 (e.g., as if it were a third antenna diversity). The BCAJ 420 may contain digital signal power detectors, which may be used to enable the adaptive filter for output of residual signal 405, inform the state of BC select signal 406, or determine tap update parameters. In some cases, the detection of a correlated signal can be asserted by retrieving BCAJ tap weights. That is, the presence of the correlated signal can be confirmed by analyzing the BCAJ tap weights to determine if the adaptive filter has found a high correlation between the desired (or reference) signal and the received signal.

When the BCAJ 420 is active it produces a residual signal 408 that approximates or converges to the least common signals on the two antennas 112. When a jammer signal dominates the RF receivers, the BCAJ 420 outputs a residual signal 408 with the common jammer signals removed (e.g., or substantially removed) and the desired signal may be insignificantly affected. In the absence of jammers, the signals 402 at the antennas 112 contain the desired signals while the BCAJ 420 produces a residual signal 408 of white circuit noise because it is treating desired signals as jammers. Sensitivity-level operation may be preserved on both antennas 112 with little to no loss of sensitivity performance. In this manner, the receiver can achieve jammer rejection, even very high jammer rejection in some instances, while maintaining sensitivity operations.

The control component 430 may be a jammer power detection and antenna correlation test component. The control component 430 may employ software controls and may be used to intelligently select antenna diversity. The control component 430 may input a control signal 432 to the BCAJ 420. There are many ways that software controls may be used. Some examples are listed here, but others may be used. In some examples, the control component 430 may set the BCAJ 420 to be operational at all times. Alternatively, the control component 430 may set the desired (or reference) input of BCAJ 420 to the antenna path which has the greater power level by swapping the input cross switches at switch 404. For example, the antenna path with the greater signal strength can be sent to the desired (or reference) signal input, and the signal with the weaker signal strength may be sent to the received signal input.

The control component 430 may assert positive detection of jamming when the signals at antennas 112 have a power level over a threshold level and the BCAJ 420 indicates a high correlation coefficient. The control component 430 may detect jamming and control the functioning of the BCAJ 420. For example, the control component 430 may disable decoding based on the BCAJ 420 when a jammer is not detected because the BCAJ 420 would degrade the received signal. For example, the control component 430 may indicate to preamble detection and path combining component 410 to send one or more of the signals 402 to digital receiver 440 when a jammer is not detected (e.g., when signal strength of signals 402 does not satisfy a threshold power level or the tap weights of BCAJ 420 indicate that a strongly correlated signal is not present). Conversely, the control component may enable decoding based on the BCAJ 420 when a jammer is detected. For example, when a signal strength satisfying a threshold power level is detected at each of antennas 112-*e* and 112-*f*, and an indication from the adaptive filter of BCAJ 420 (e.g., based on the tap weights converging or indicating a strong correlation is present) indicates correlation satisfying a correlation threshold, BCAJ 420 may indicate to preamble detection and path combining component 410 to send the residual signal 408 to digital receiver 440.

The control component 430 may also freeze (e.g., suspend updating) the BCAJ 420 tap weights (e.g., tap weights of the adaptive filter). For example, when a good signal has been detected in the preamble, the control component 430 may freeze the tap weights so any fluctuations or pulses in the received signals do not affect the tap weights. The control component 430 may freeze the BCAJ tap weights when the device is in a transmit mode (e.g., the antennas 112 are transmitting). Alternatively, the control component 430 may freeze the BCAJ tap weights when the desired signal is detected (e.g., a jammer signal is not present).

The control component 430 may set a time constant of the BCAJ 420 based at least in part on a signal property of a desired or expected communication signal. For example, the control component may set the time constant at greater than a duration of a preamble period of the communication signal so that the BCAJ 420 is less impacted by reception of desired signals. The preamble may be a signature of a known communication signal and the preamble period may be a duration or correlation duration (e.g., symbol duration) of the preamble. In some examples, the time constant may be greater than the duration of the preamble period by a multiple of the correlation duration.

When the digital receiver detects very low errors despite the presence of a large jammer, it may indicate that jammer signals are outside the operating bandwidths or that the jammers are not degrading the receive integrity. In such a scenario, the preamble detection and path combining component 410 can reuse the original antenna paths (e.g., signals 402-*a* and 402-*b*) without using the BCAJ 420 outputs. The control component 430 may detect this condition (e.g., for a preamble in the original antenna paths).

If the control component 430 enables the BCAJ 420, the BCAJ 420 outputs a decorrelated or residual signal 408. When the BCAJ detects a correlated signal (e.g., based on signal strength of signals 402 or correlation detection according to filter tap weights), the control component 430 may indicate to the preamble detection and path combining component 410 to process the residual signal 408. This processed signal is then forwarded to the digital receiver 440. The digital receiver 440 may output the desired signal 444.

In some examples, the communication system uses a Link16 communication protocol. The BCAJ 420 may be applied to improve Link16 receptions when there is a suspicion that the signal is being jammed. This is because if no jammer signal is present, the BCAJ adaptive filter 420 is unable to correctly train, which can degrade the signals received on both antennas 112. Upon entering a Link16 network, a Link16 Signal Message Processor (SMP) may determine whether to activate or freeze BCAJ 420 by examining specific Link16 data. The SMP may examine the Link16 data three times per frame (e.g., every 4 seconds), for example. If the BCAJ 420 is activated, the above adaptive control logic discussed with respect to the control component 430 may be performed before (e.g., one or more times according to a periodicity) the start of a Link16 slot, since this is the least likely time to receive Link16 signals.

The control component 430 may activate BCAJ 420 adaptive control logic for any or a combination of the following reasons: less than a threshold percentage (e.g., 1%) of the assigned receive slots resulted in a sync detection; more than a threshold percentage (e.g., 5%) of the receptions contained Link16 header failures; more than a threshold percentage (e.g., 5%) of the receptions contained Link16 data failures; a number of correctable Reed-Solomon errors per reception is greater than a threshold percentage (e.g., 50%) of the maximum number of correctable Reed-Solomon errors possible per reception; the number of pulse erasures per reception is greater than a threshold percentage (e.g., 50%) of the maximum number of pulse erasures possible per reception; or the control component 430 may deactivate the BCAJ 420 adaptive control logic if BCAJ 420 stops receiving significant power (e.g., at the desired or received input) or is unable to correlate.

The BCAJ 420 may also be used to improve concurrent multi-net receptions (CMR) for both jammer and non-jammer scenarios. The multiple receptions help the BCAJ correctly train in non-jamming scenarios. Thus the control component 430 will also activate the BCAJ 420 adaptive control logic if greater than a threshold percentage (e.g., 10%) of CMR defined slots contain multiple receptions.

Figure 5:
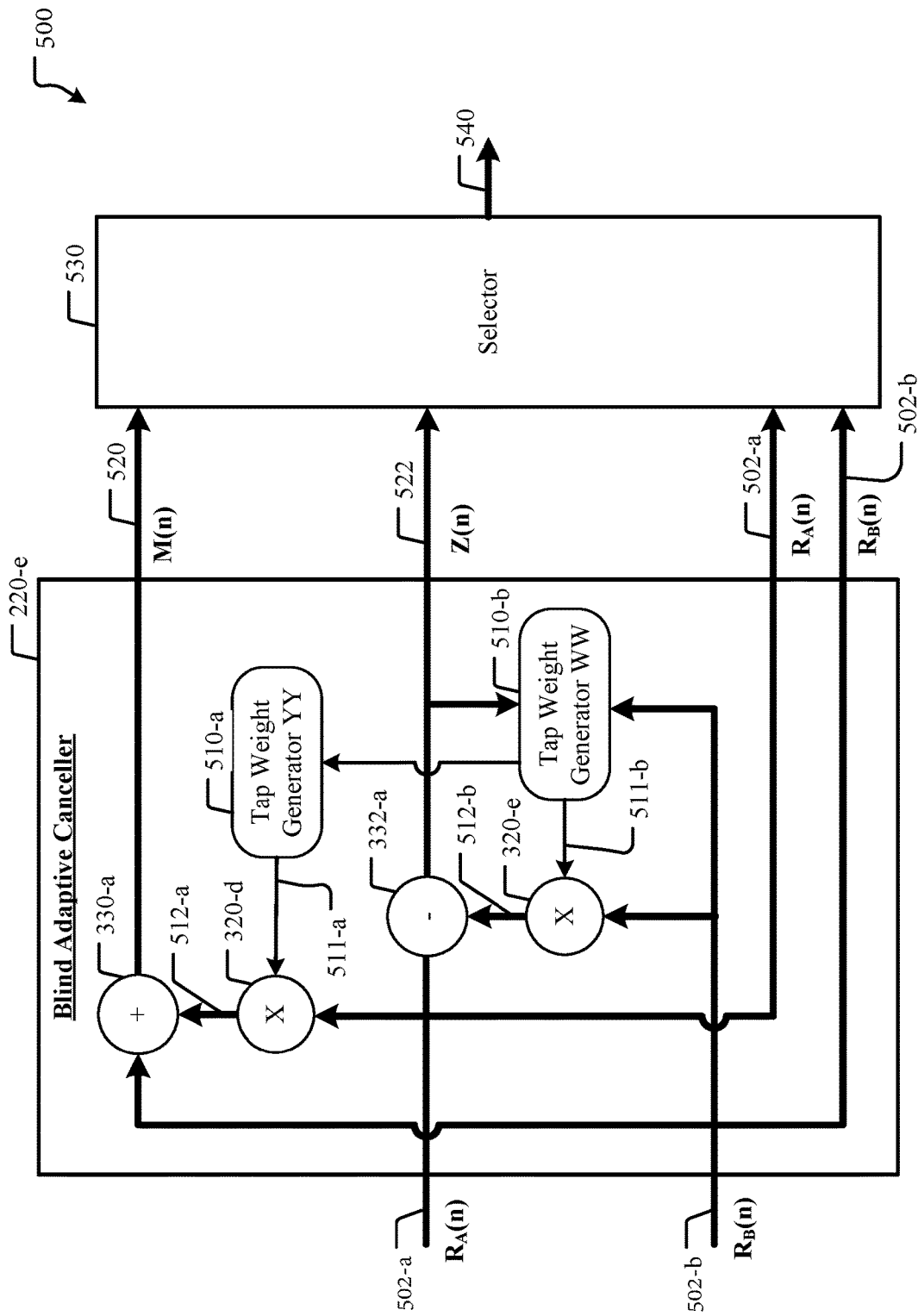
FIG. 5 illustrates another example of a blind adaptive canceller that supports interference and jammer cancellation for radios in accordance with aspects of the present disclosure.

FIG. 5 illustrates another example of an anti jamming device 500 including a blind adaptive canceller that supports interference and jammer cancellation for radios in accordance with aspects of the present disclosure. The anti jamming device 500 may implement aspects of the anti-jammer manager 170 of FIG. 1, the communication device 200, the adaptive filter 300 of FIG. 3, and the anti-jammer 400.

The anti jamming device 500 may include a BAC 220-*e* and a selector 530. A first signal over a sub-band n, $R_A(n)$, first signal 502-*a* and a second signal 502-*b* over the sub-band n, $R_B(n)$, second signal 502-*b* are inputs to the BAC 220-*e*. The BAC 220-*e* may include tap weight generators 510-*a* and 510-*b* (collectively referred to herein as tap weight generators 510), multipliers 320-*d* and 320-*e*, an adder 330-1, and a subtractor 332-*a*. Tap weight generator 510-*a* may generate a first weighting factor 511-*a* and tap weight generator 510-*b* may generate a second weighting factor 511-*b*. The first signal 502-*a* may be multiplied by the first weighting factor 511-*a* to obtain a weighted first signal 512-*a* and the second signal 502-*b* may be multiplied by the second weighting factor 511-*b* to obtain a weighted second signal 512-*b*.

The signal M(n) 520 may be a combination of $R_A(n)$ and $R_B(n)$, which may be a correlated signal. The signal Z(n) 522 may be the received signal with the jammer signal (e.g., J(n)) removed. For example, signal Z(n) 522 may be obtained by subtracting the weighted second signal 512-*b* from the first signal 502-*a* or by subtracting the weighted first signal 512-*a* from the second signal 502-*b* (not shown). The signal Z(n) 522 may approximate the desired signal, S(n). The signals 502-*a*, 502-*b*, 520, and 522 may be inputted to the selector 530. The selector 530 may process the input signals and provide an output signal 540 (e.g., output data). The selector 530 may determine whether to process (e.g., perform demodulation and decoding) on the signal M(n) 520, the signal Z(n) 522, or one or more of signals 502-*a* or 502-*b*. For example, the selector 530 may process signal Z(n) 522 in the presence of jamming (e.g., based on signal strength of signals 502 or tap weights 511 output by tap weight generators 510-*a* and 510-*b*), and may process signal M(n) 520 or one or more of signals 502-a or 502-b where the presence of jamming is not detected. The output signal 540 should contain the desired signal.

Figure 6:
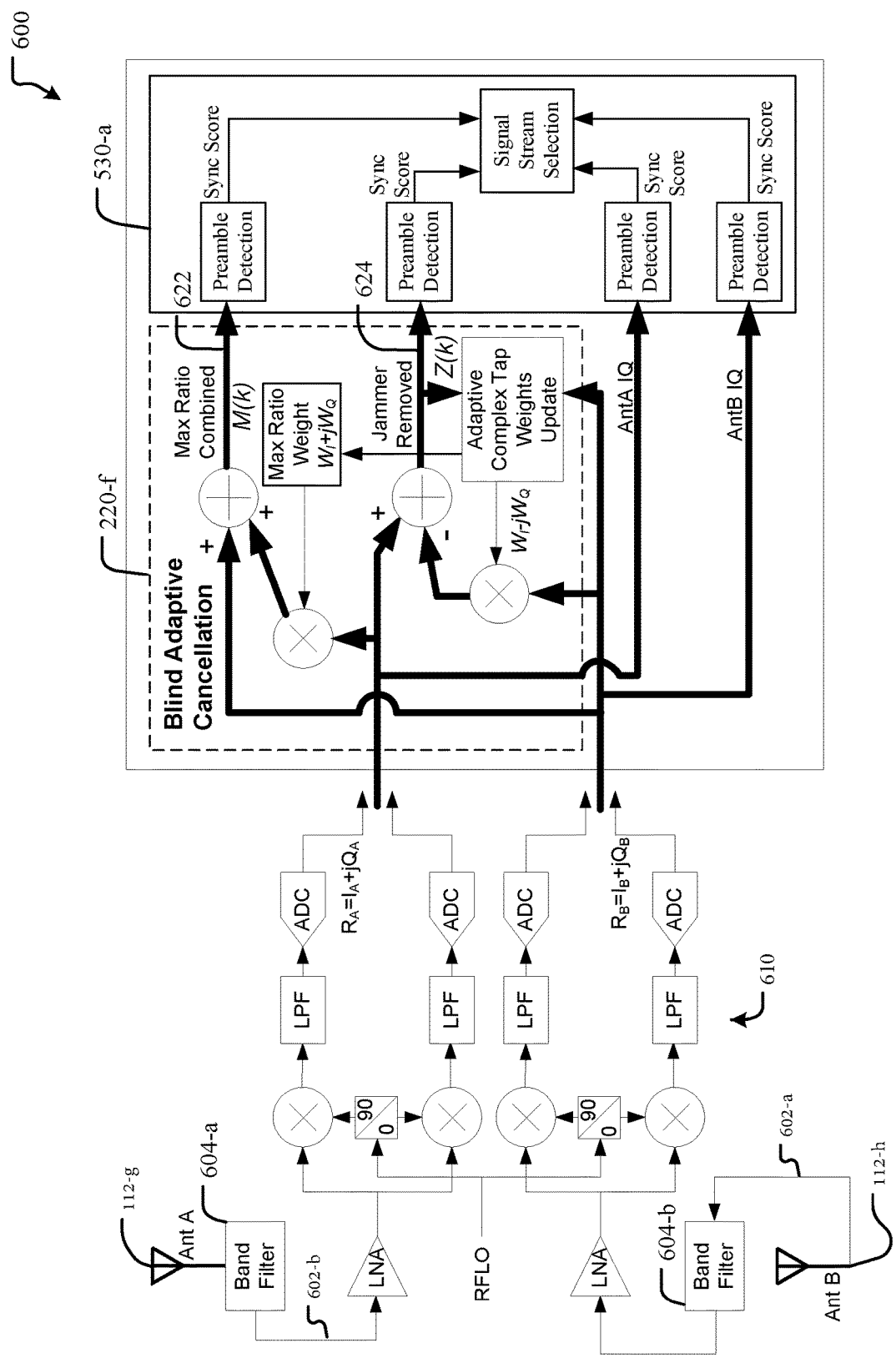
FIG. 6 illustrates another example of an anti-jammer manager that supports interference and jammer cancellation for radios in accordance with aspects of the present disclosure.

FIG. 6 illustrates an example of a communication device 600 that supports interference and jammer cancellation for radios in accordance with aspects of the present disclosure. In some examples, the communication device 600 may be included in a wireless communication system, such as wireless communication system 100. The communication device 200 may be or include one or more aspects of the communication device 200 or the anti-jammer manager 170 of FIG. 1, or the anti-jamming device 500.

The communication device 600 may include two antennas 112-g and 112-h, which may be examples of the antennas 112 of FIGS. 1, 2, and 4. The first antenna 112-g (antenna A) receives a first signal 602-a and the second antenna 112-h (antenna B) receives a second signal 602-b. The signals are input to band filters 604-a and 604-b which spectrally split the signals 602 into sub-bands. The split signals are input to circuitry 610 which processes (e.g., downconverts and digitizes) the signals. The processed and split signals are input to a BAC 220-f. The BAC 220-f processes the signals and provides signals to the selector 530-a.

FIG. 6 illustrates another adaptive blind jammer/interferer algorithm. For a two-antenna platform, the identical receiver chains produce two digital baseband quadrature (IQ) data streams highly correlated with each other. A receiver local oscillator RFLO is driven from the same source to ensure that the received IQ signals from both of the antennas 112 remain phase coherent. The two IQ data streams contain both jammer/interferer and the desired signal with different magnitudes and RF phases. When the two antennas are spatially and directionally separated, the ratios of Jammer-to-Signal power ratio (JSR) of the two IQ data stream are likely different.

A one-tap complex adaptive filter uses an IQ signal from a first antenna 112-g (Antenna A) as the received signal and the IQ signal from the second antenna 112-h as the training signal. Using a conventional adaptation algorithm such as the LMS algorithm, the tap weight may be adapted to align RF amplitude and phase of the two IQ signal streams. Consequently, the adaptive filter output contains residual IQ signals that are least correlated to both antenna signals (e.g., these signals are provided to the selector 530-a). In so doing, the filter produces output signals with jammer/interferer reduced, such as signal 622 generated according to MRC and signal 624 with the jammer removed (e.g., residual signal having highest correlated component removed). Due to the difference between the JSR of the two antennas, the residual signal (signal 624) can be slightly degraded from IQ subtraction if the two desired signal RF phases are less than 90 degrees. The level of signal strength reduction may depend on the difference of the JSR of the two antennas 112.

Because of the nature of blind cancellation, when there are no jammers or interferers in the received IQ data streams, the BAC 220-f seeks to remove desired signal output as well. During the course of tap weight adaptation, RF amplitudes and phases of the desired signal may be aligned. The steady-state tap weight may approach the maximum ratio combing (MRC) factor when the jammer is weak or not present. As a result, the BAC 220-f can produce an MRC combined output by adding the two IQ signals when weighted with the MRC factor. The MRC gain can be greater than 3 dB in an environment without jammers or interferers.

The complex IQ data stream from Antenna A 112-g may be expressed as $R_A$ and that for Antenna B 112-h may be expressed as $R_B$, or as in Equations (23) and (24):

$$R_A(k) = m_{JA} e^{j\theta_A} \cdot J(k) + c_{SA} e^{j\varphi_A} \cdot S(k) + n_A(k) \qquad (23)$$

$$R_B(k) = m_{JB} e^{j\theta_B} \cdot J(k) + c_{SB} e^{j\varphi_B} S(k) + n_B(k) \qquad (24)$$

where $J(k)$ is the sampled baseband equivalent jammer or interferer signal, $S(k)$ is the sampled baseband equivalent desired signal, $m_{JA}$, $m_{JB}$, $c_{SA}$, and $c_{SB}$ are amplitude responses of RF propagation of jammers and desired signals for the two IQ data streams, $q_A$, $q_B$, $j_A$, and $j_B$ are the associated RF phase responses of jammers and desired signals, and $n_A$ and $n_B$ are receiver complex white circuit noise. They receiver complex white circuit noise may be assumed to have the same noise spectral density.

A simple one-tap complex adaptive filter may be used for jammer cancellation with a complex tap weight w. The adaptive filter performs tap weight adaptation to produce canceller output that is de-correlated with the two IQ data streams. The filter output may be expressed as Equation (25):

$$Z(k) = R_A(k) - w^* \cdot R_B(k) + n_A(k) - w^* \cdot n_B(k) \qquad (25$$
$$= \left( m_{JA} e^{j\theta_A} - m_{JB} w^* e^{j\theta_B} \right) \cdot J(k) +$$
$$\left( c_{SA} e^{j\varphi_A} - c_{SB} w^* e^{j\varphi_B} \right) \cdot S(k) + n_A(k) - w^* n_B(k)$$

For an ideal adaptive filter that is constructed to remove only the jammer, the tap weight may approach Equation (26):

$$w = \frac{m_{JA}}{m_{JB}} e^{-j(\theta_A - \theta_B)} \qquad (26)$$

The output of the Blind Canceller may then be calculated as according to Equation (27):

$$Z(k) = \qquad (27)$$
$$m_{JA} \left( \frac{c_{SA}}{m_{JA}} e^{j\varphi_A} - \frac{c_{SB}}{m_{JB}} e^{j(\varphi_B + \theta_A - \theta_B)} \right) \cdot S(k) + n_A(t) - \frac{m_{JA}}{m_{JB}} e^{j(\theta_A - \theta_B)} n_B(k)$$

When the jammer to signal ratios ($m_{JA}/c_{SA}$) and ($m_{JB}/c_{SB}$) differ and the combined RF phase responses are random, the subtraction of signal terms may not seriously degrade the desired signal level and can sometimes enhance the signal level. Furthermore, when operating in very hostile environments, both the jammer and the desired signal level may be much stronger than the receiver circuit noise. Using this method, the jammer strength can be highly reduced while the desired signal quality suffers minor degradation even when the JSRs of the two data stream are close. In practical operations, the BAC 220-f does not differentiate between signal and jammer.

Figure 7:
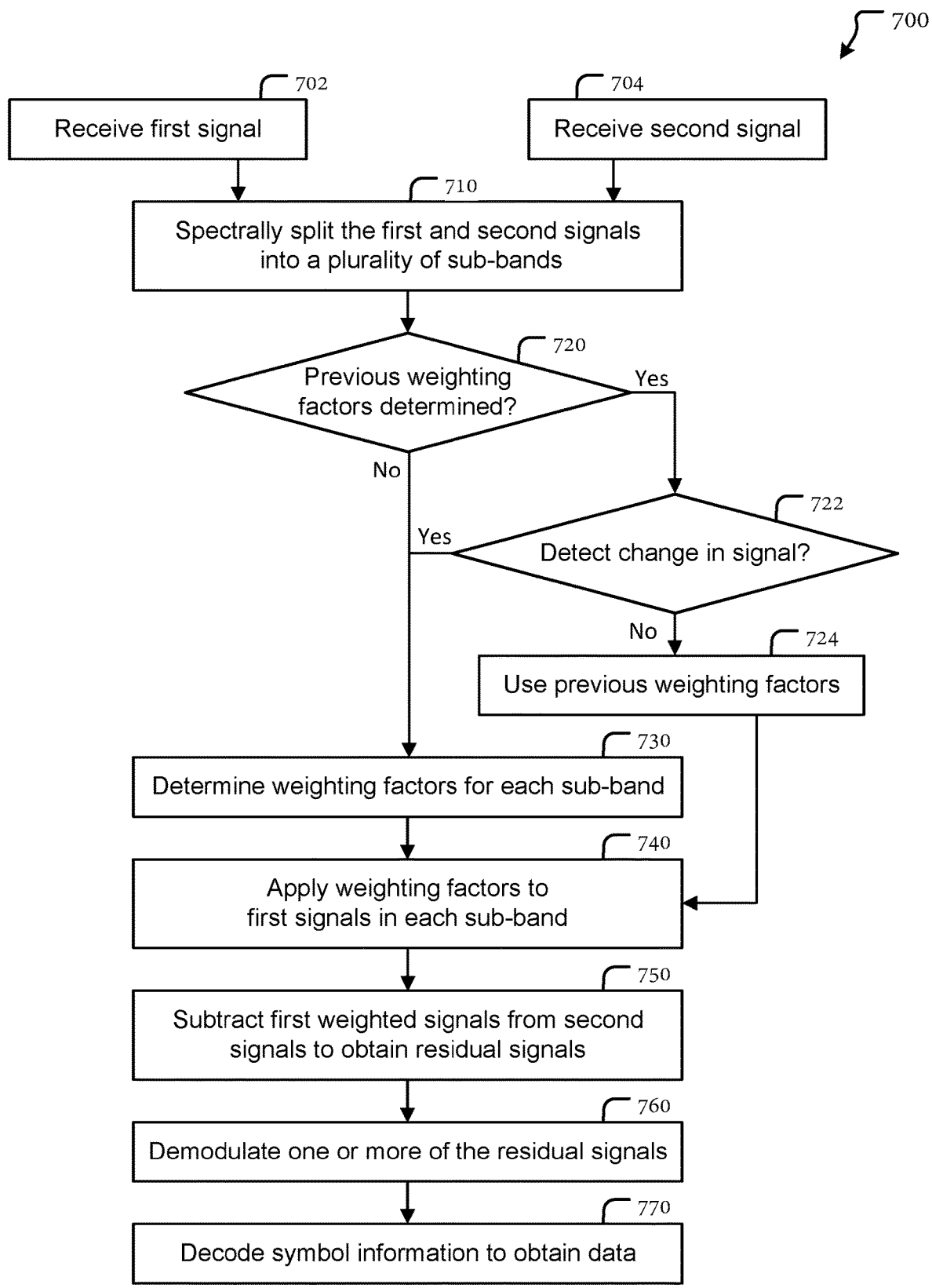
FIGS. 7 and 8 show flowcharts illustrating methods that support interference and jammer cancellation for radios in accordance with aspects of the present disclosure.

FIG. 7 shows a flowchart illustrating a method 700 that supports interference and jammer cancellation for radios in accordance with aspects of the present disclosure. The operations of method 700 may be implemented by a communication device, a BAC, or an anti-jammer manager or their components as described herein. For example, the operations of method 700 may be performed by a transmitter as described with reference to FIGS. 1 through 6 and/or a device as described with reference to FIG. 7. In some examples, a processor may execute a set of instructions to control the functional elements of the device to perform the functions described below. Additionally or alternatively, a processor may perform aspects of the functions described below using special-purpose hardware, programmable logic, or other means.

At 702, the device receives a first signal. At 704, the device receives a second signal. The first and second signals may be from spatially diverse antennas. In some examples, more than two antennas may be used.

At 710, the device spectrally splits the first signal and the second signal into n sub-bands. The sub-bands may be of equal or different bandwidths. The signals for each sub-band may be input to one or more BAC components.

At 720, the device determines if previous weighting factors have been determined. If not, the device determines tap weights for each of the sub-bands at 730. In some examples, an adaptive filter performs 730. If, at 720, the weighting factors have already been determined, the device proceeds to 722. At 722, the device determines whether there has been a change in the received first and second signals. For example, the device may determine whether the signal strength of the first and second signals has changed or satisfies a threshold. The signal strength of the first and second signals may be evaluated at a time where a desired or expected signal is not present, in some cases. Additionally or alternatively, a change in the signals may be detected based on sync detection of a desired signal in the first signal or second signal, or other errors in decoding the first signal or the second signal (e.g., header failures, data failures, change in erasures or correctable errors, etc.). If a change is detected, the device proceeds to 730. If not, the device proceeds to 724 to use the previously determined weighting factors. Whether at 730 or 724, the device proceeds to 740.

At 740, the device applies the weighting factors to the first signals in each sub-band. At 750, the device subtracts the first weighted signals from the second signals to obtain the residual signals for the sub-bands. At 760, the residual signals are demodulated to obtain symbol information. At 770, the device decodes the symbol information to obtain data. In this way, the desired signal is recovered despite the presence of jammers.

The operations of 702, 704, 710, 720, 722, 724, 730, 740, 750, 760, and 770 may be performed according to the methods described herein. In some examples, aspects of the operations of 702, 704, 710, 720, 722, 724, 730, 740, 750, 760, and 770 may be performed by a communication device, anti-jammer manager, or BAC as described with reference to FIGS. 1 through 6.

Figure 8:
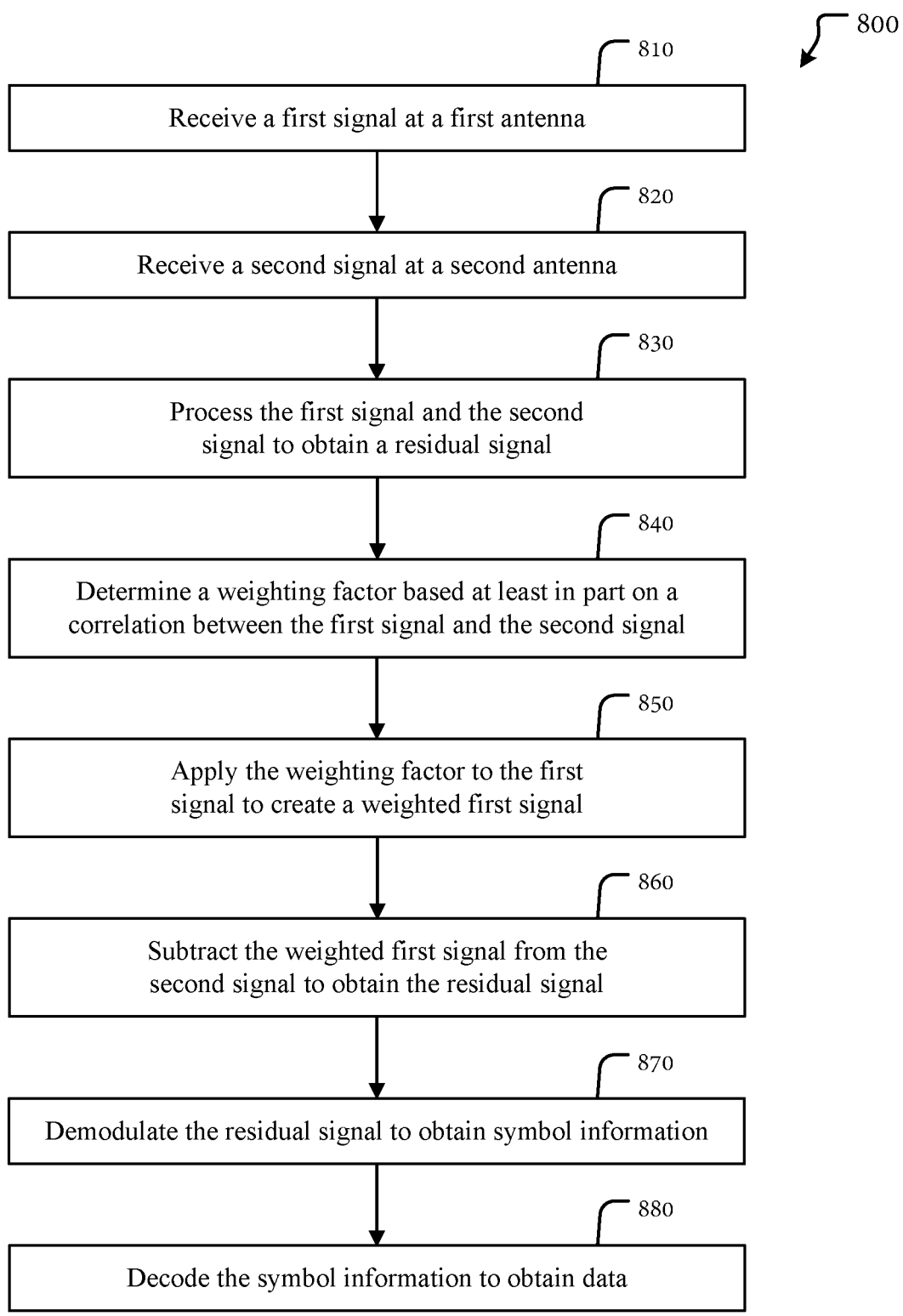

FIG. 8 shows a flowchart illustrating a method 800 that supports interference and jammer cancellation for radios in accordance with aspects of the present disclosure. The operations of method 800 may be implemented by a communication device, a BAC, or an anti-jammer manager or their components as described herein. For example, the operations of method 800 may be performed by a communication device as described with reference to FIGS. 1 through 6. In some examples, a processor may execute a set of instructions to control the functional elements of the device to perform the functions described below. Additionally or alternatively, a processor may perform aspects of the functions described below using special-purpose hardware, programmable logic, or other means.

At 810, the method 800 receives a first signal at a first antenna. At 820, the method 800 receives a second signal at a second antenna. 810 and 820 may be performed by two spatially separated antennas 112 as described herein. In some examples, the first signal received at the first antenna carries the same information (e.g., jammer signal and desired signal) as the second signal received at the second antenna. In some examples, a distance between the first antenna and the second antenna is greater than one wavelength of a frequency (e.g., the desired signal frequency) of the first signal and the second signal. In some examples the first signal and the second signal are positioning signals (e.g., from a GPS transmitter) in a degraded environment. In some examples, the first antenna and the second antenna are mounted on a vehicle.

At 830, the method 800 processes the first signal and the second signal to obtain a residual signal. The processing may include 840, 850, and 860. At 840, the method 800 includes determining a weighting factor based at least in part on a correlation between the first signal and the second signal. In some examples, determining the weighting factor further includes detecting a change in at least one of the first signal or the second signal and updating the weighting factor based at least in part on detecting the change.

In some examples, determining the weighting factor further includes computing an autocorrelation of the second signal and a cross correlation of the first signal and the second signal and determining the weighting factor based at least in part on a ratio of the autocorrelation of the second signal to the cross correlation.

At 850, the method 800 includes applying the weighting factor to the first signal to create a weighted first signal. At 860, the method 800 includes subtracting the weighted first signal from the second signal to obtain the residual signal.

At 870, the method 800 includes demodulating the residual signal to obtain symbol information. A demodulator may perform 870. In some examples, demodulating the residual signal further comprises demodulating one or more of the plurality of residual signals. At 880, the method 800 includes decoding the symbol information to obtain data. A decoder may perform 880.

In some examples, the method 800 includes spectrally splitting the first signal into a plurality of first signals and the second signal into a plurality of second signals according to a plurality of sub-bands, wherein determining the weighting factor further includes determining respective weighting factors based at least in part on respective correlations between the plurality of first signals and the plurality of second signals. In some examples, applying the weighting factor further includes applying the respective weighting factors to the plurality of first signals to create a plurality of weighted first signals. In some examples, subtracting the weighted first signal from the second signal further includes subtracting the plurality of weighted first signals from the plurality of second signals to obtain a plurality of residual signals. In some examples, a bandwidth of the plurality of sub-bands is based at least in part on one of a time of arrival of the first signal or the second signal and a distance between the first antenna and the second antenna.

In some examples, processing the first signal and the second signal further includes processing the first signal using an adaptive filter to create the weighted first signal, wherein a plurality of adaptive filter tap weights of the adaptive filter are tracked based on a minimization function of the residual signal. Some examples of processing the first signal using an adaptive filter includes inputting the second signal to a reference input (e.g., desired input) of the adaptive filter.

In some examples, the method 800 further includes determining, at a first time, to process the first signal using the adaptive filter based at least in part on a comparison of respective signal power levels of the first signal and the second signal. The method 800 may further include determining, at a second time, to process the second signal using the adaptive filter to obtain a weighted second signal, subtracting the weighted second signal from the first signal to obtain a second residual signal, demodulating the second residual signal to obtain second symbol information, and decoding the second symbol information to obtain second data.

In some examples, the plurality of adaptive filter tap weights comprise at least three adaptive filter tap weights. In some examples, processing the first signal and the second signal further includes freezing the plurality of adaptive filter tap weights during a transmit state or based at least in part on decoding (e.g., when a decoding process is successful) to obtain the data. In some example, processing the first signal and the second signal includes saturating a tap weight update magnitude for the plurality of adaptive filter tap weights.

In some examples, the method 800 includes setting a time constant of the adaptive filter to be greater than a duration of a preamble period, wherein the weighting factor is determined based at least in part on the time constant. In some examples, the minimization function comprises a least mean squares function.

Some examples of the method 800 includes determining that a signal-to-noise ratio (SNR) of at least one of the first signal or the second signal is below a threshold SNR level at a first time or a received power of at least one of the first signal or the second signal satisfies a threshold received power level, wherein processing the first signal and the second signal to obtain the residual signal is based at least in part on determining that the SNR is below the threshold SNR level or the received power satisfies the threshold received power level.

In some examples, the method 800 further includes determining, at a second time, that the SNR of at least one of the first signal or the second signal satisfies the threshold SNR level or that the received power does not satisfy the threshold received power level, and disabling the processing of the first signal and the second signal to obtain the residual signal for the second time, and demodulating a third signal that is based at least in part on the first signal or the second signal for the second time.

Some examples of the method 800 includes enabling the demodulating of the residual signal based at least in part on determining that the weighting factor satisfies a threshold.

The operations of 810, 820, 830, 840, 850, 860, 870, and 880 may be performed according to the methods described herein. In some examples, aspects of the operations of 810, 820, 830, 840, 850, 860, 870, and 880 may be performed by a communication device, anti-jammer manager, or BAC as described with reference to FIGS. 1 through 6.

Figure 9:
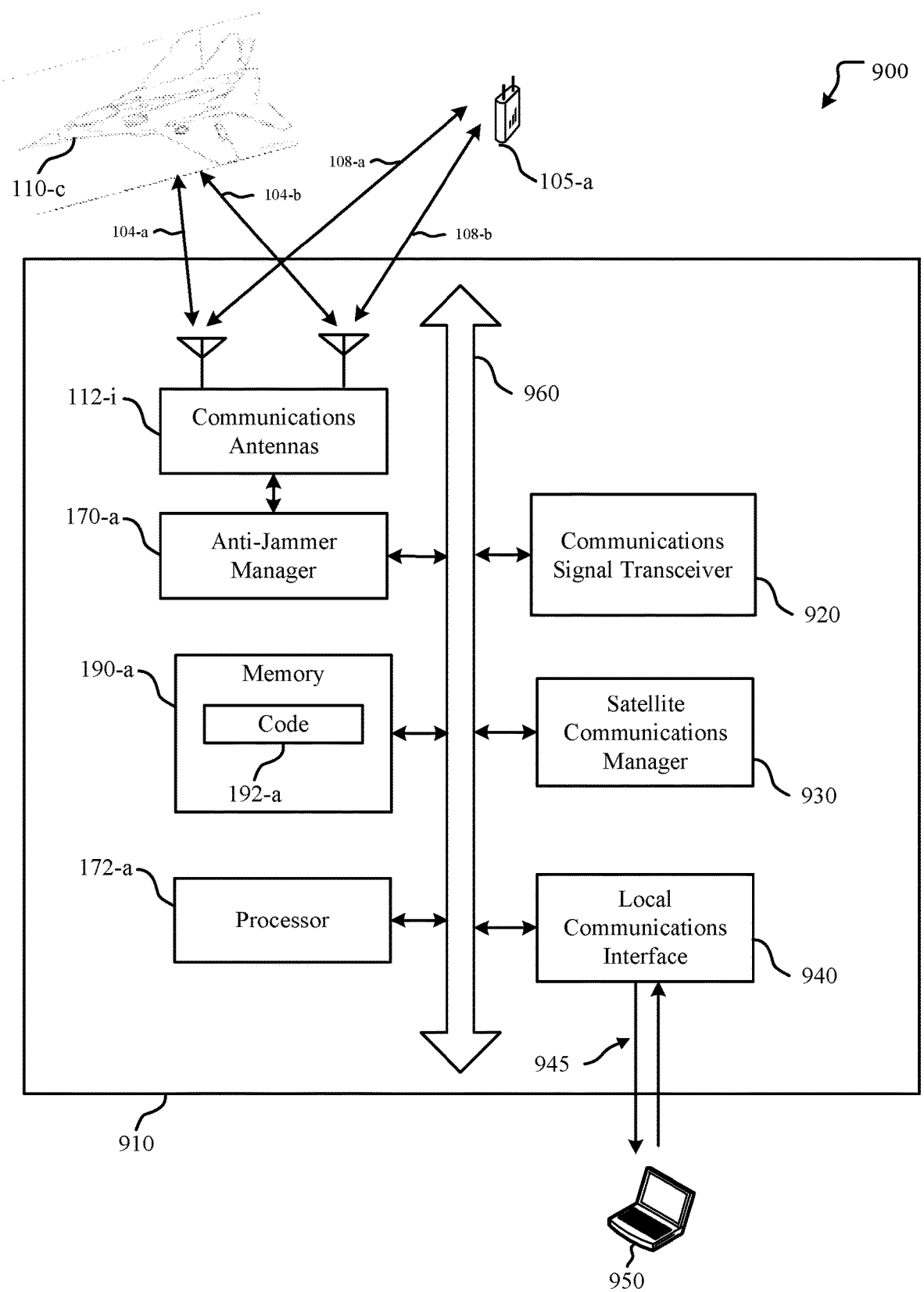
FIGS. 9 and 10 illustrate examples of devices that support interference and jammer cancellation for radios in accordance with aspects of the present disclosure.

FIG. 9 shows a block diagram illustrating a communication system 900, in accordance with aspects of the present disclosure. The communication system 900 may be an example of the communication system 100 as described with reference to FIG. 1. The communication system 900 includes a communications device 910, which may be onboard a vehicle such as an aircraft or a ship. The communication system 900 also includes a friendly device 110-c and a jammer device 105-a.

The communications device 910 may include an anti-jammer manager 170-a and two or more communication antennas 112-i. In some examples, the anti-jammer manager 170-a may be a single device, for example within a mobile platform such as an aircraft 230. In other examples, the features performed by the anti-jammer manager 170-a may be divided or split between two or more devices. The anti-jammer manager 170-a may be configured to perform anti-jammer mitigation as described with reference to FIGS. 1-7.

The communications device 910 may include a processor 172-a and a memory 190-a. The memory 190-a may store computer-readable, computer-executable software or firmware code 192-a including instructions that, when executed by the processor, cause the anti-jammer manager 170-a and the communications device 910 to perform various functions described herein. In some examples, the code 192-a may not be directly executable by the processor but may cause a computer (e.g., when compiled and executed) to perform functions described herein. The processor 172-a may include an intelligent hardware device (e.g., a central processing unit (CPU), a microcontroller, an application-specific integrated circuit (ASIC), etc.). Each of the components of the communications device 910 may communicate, directly or indirectly, with one another (e.g., via one or more buses 960).

The communications signal transceiver 920 may include various circuits and/or processors to support receiving, transmitting, converting, coding, and/or decoding of signals 104-a and 104-b despite the presence of jammer signals 108-a and 108-b. For example, the communications signal transceiver 920 may include a modem to modulate the packets and provide the modulated packets to a communications antenna 112-i for transmission, and to demodulate packets received from the communications antenna 112-i.

The communications device 910 may be configured to support communications with one or more devices 950 via signals transmitted over wired and/or wireless connection(s) 945. The communications device 910 may employ a local communications interface 940 supporting any number of wired and/or wireless links between the communications device 910 and the one or more devices 950.

As illustrated by the present example, the anti-jammer manager 170-a may be implemented as a separate module of the communications device 910, which may be configured as a standalone set of instructions (e.g., a software module having a set of instructions stored in memory, which may be a standalone portion of memory) and/or a separate processing element (e.g., a standalone CPU, microcontroller, ASIC, field-programmable gate array (FPGA), or other like integrated circuit (IC)). In other examples, some or all of the operations of the anti-jammer manager 170-a may be controlled by instructions stored in the memory 190-a (e.g., a portion of the code 192-a), which in some examples may be performed by the processor 172-a. The anti-jammer manager 170-a may control and/or configure various components of the communications device 910 to perform the one or more operations of the exemplary methods 700 and 800 described with reference to FIGS. 7-8.

The communications device 910 may include a satellite communications manager 930, configured to manage various aspects of communications between the communications device 910 and any communications satellite. As illustrated by the present example, the satellite communications manager 930 may be implemented as a separate module of the communications device 910, which may be configured as a standalone set of instructions (e.g., a software module having a set of instructions stored in a standalone portion of memory) and/or a separate processing element (e.g., a standalone CPU, microcontroller, ASIC, FPGA, or like IC). In other examples, some or all of the operations of the satellite communications manager 930 may be controlled by instructions stored in the memory 190-*a* (e.g., a portion of the code 192-*a*), which in some examples may include steps performed by the processor 172-*a*.

In various examples, the components of the communications device 910 may be divided into subassemblies, where various components may be included in a subassembly either in part, or in its entirety.

Figure 10:
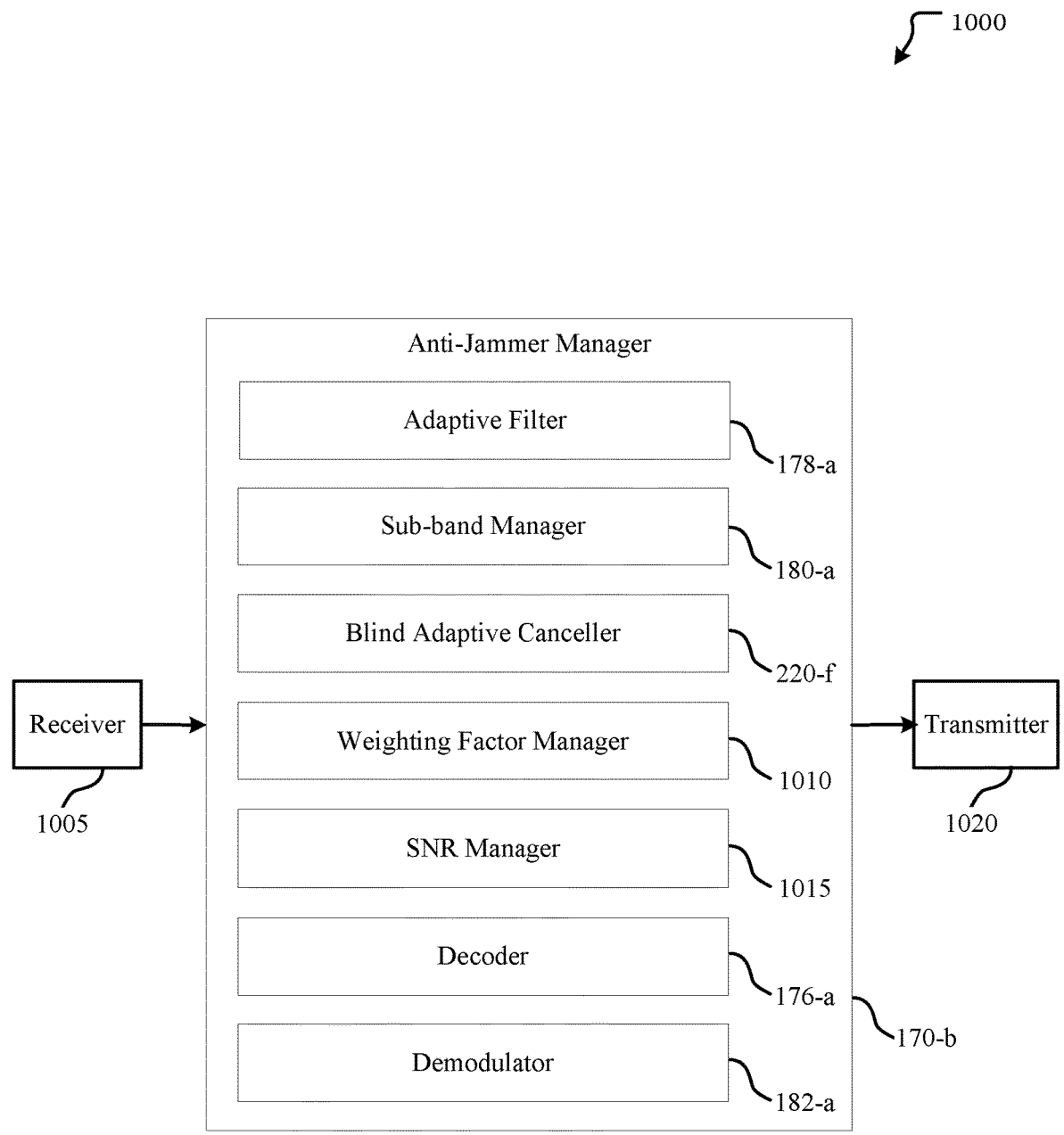

FIG. 10 shows a block diagram 1000 of an anti-jammer manager 170-*b*, in accordance with aspects of the present disclosure. The anti-jammer manager 170-*b* may be a portion of any of a communication device, a radio, or a transceiver as described with reference to FIGS. 1-9. The anti-jammer manager 170-*b* may mitigate the effects of a harmful jammer signal. The anti-jammer manager 170-*b* may also be or include a processor. Each of the components of the anti-jammer manager 170-*b* may be in communication with each other to provide the functions described herein. The anti-jammer manager 170-*b* may be configured to receive signals from a receiver 1005, and deliver signals to a transmitter 1020 or other device using various techniques, including wired or wireless communications, control interfaces, user interfaces, or the like.

The anti-jammer manager 170-*b* may include an adaptive filter 178-*a* that determines tap weights and perform one or more of the aspects of the adaptive filter 300 shown in FIG. 3 and performs as described with reference to FIGS. 1-9. The anti-jammer manager 170-*b* may also include a subband manager 180-*a*, which may spectrally splint incoming received signals and may perform aspects of the functions as described with reference to FIGS. 1-9.

The anti-jammer manager 170-*b* may include a BAC 220-*f* which may perform extraction of a correlated signal and thus cancellation of a jammer, as described with reference to FIGS. 1-9. The anti-jammer manager 170-*b* may also include a weighting factor manager 1025, which may perform one or more of the aspects of determining when to freeze or update tap weights, as described with reference to FIGS. 1-9.

The anti-jammer manager 170-*b* may also include an SNR manager 1015, which may provide control for the BAC 220-*f*, as described with reference to FIGS. 1-9. The anti-jammer manager 170-*b* may also include a decoder 176-*a* and a demodulator 182-*a*, which may perform aspects of the functions as described with reference to FIGS. 1-9.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An anti-jamming method, comprising:
   receiving a first signal at a first antenna;
   receiving a second signal at a second antenna;
   processing the first signal and the second signal to obtain a residual signal, wherein the processing comprises:
   determining a weighting factor based at least in part on a correlation between the first signal and the second signal;
   applying the weighting factor to the first signal to create a weighted first signal; and
   subtracting the weighted first signal from the second signal to obtain the residual signal;
   demodulating the residual signal to obtain symbol information; and
   decoding the symbol information to obtain data.

2. The method of claim 1, further comprising:
   spectrally splitting the first signal into a plurality of first signals and the second signal into a plurality of second signals according to a plurality of sub-bands, wherein:
   determining the weighting factor further comprises determining respective weighting factors based at least in part on respective correlations between the plurality of first signals and the plurality of second signals;
   applying the weighting factor further comprises applying the respective weighting factors to the plurality of first signals to create a plurality of weighted first signals;
   subtracting the weighted first signal from the second signal further comprises subtracting the plurality of weighted first signals from the plurality of second signals to obtain a plurality of residual signals; and
   demodulating the residual signal further comprises demodulating one or more of the plurality of residual signals.

3. The method of claim 2, wherein a bandwidth of the plurality of sub-bands is based at least in part on one of a time of arrival of the first signal or the second signal and a distance between the first antenna and the second antenna.

4. The method of claim 1, wherein determining the weighting factor further comprises:
   detecting a change in at least one of the first signal or the second signal; and
   updating the weighting factor based at least in part on detecting the change.

5. The method of claim 1, wherein determining the weighting factor further comprises:
   computing an autocorrelation of the second signal and a cross correlation of the first signal and the second signal; and
   determining the weighting factor based at least in part on a ratio of the autocorrelation of the second signal to the cross correlation.

6. The method of claim 1, wherein processing the first signal and the second signal further comprises:
   processing the first signal using an adaptive filter to create the weighted first signal, wherein a plurality of adaptive filter tap weights of the adaptive filter are tracked based on a minimization function of the residual signal.

7. The method of claim 6, further comprising:
   inputting the second signal to a reference input of the adaptive filter.

8. The method of claim 6, further comprising:
   determining, at a first time, to process the first signal using the adaptive filter based at least in part on a comparison of respective signal power levels of the first signal and the second signal.

9. The method of claim 6, further comprising:
   determining, at a second time, to process the second signal using the adaptive filter to obtain a weighted second signal;
   subtracting the weighted second signal from the first signal to obtain a second residual signal;
   demodulating the second residual signal to obtain second symbol information; and
   decoding the second symbol information to obtain second data.

10. The method of claim 6, wherein the plurality of adaptive filter tap weights comprise at least three adaptive filter tap weights.

11. The method of claim 6, wherein processing the first signal and the second signal further comprises:
    freezing the plurality of adaptive filter tap weights during a transmit state or based at least in part on decoding to obtain the data.

12. The method of claim 6, wherein processing the first signal and the second signal comprises:
    saturating a tap weight update magnitude for the plurality of adaptive filter tap weights.

13. The method of claim 6, further comprising:
    setting a time constant of the adaptive filter to be greater than a duration of a preamble period, wherein the weighting factor is determined based at least in part on the time constant.

14. The method of claim 6, wherein the minimization function comprises a least mean squares function.

15. The method of claim 1, further comprising:
    determining that a signal-to-noise ratio (SNR) of at least one of the first signal or the second signal is below a threshold SNR level at a first time or a received power of at least one of the first signal or the second signal satisfies a threshold received power level, wherein processing the first signal and the second signal to obtain the residual signal is based at least in part on determining that the SNR is below the threshold SNR level or the received power satisfies the threshold received power level.

16. The method of claim 15, further comprising:
    determining, at a second time, that the SNR of at least one of the first signal or the second signal satisfies the threshold SNR level or that the received power does not satisfy the threshold received power level;

disabling the processing of the first signal and the second signal to obtain the residual signal for the second time; and demodulating a third signal that is based at least in part on the first signal or the second signal for the second time.

17. The method of claim 1, further comprising:
enabling the demodulating of the residual signal based at least in part on determining that the weighting factor satisfies a threshold.

18. The method of claim 1, wherein the first signal received at the first antenna is the same as the second signal received at the second antenna.

19. The method of claim 1, wherein a distance between the first antenna and the second antenna is greater than one wavelength of a frequency of the first signal and the second signal.

20. The method of claim 1, wherein the first signal and the second signal are positioning signals in a degraded environment.

21. The method of claim 1, wherein the first antenna and the second antenna are mounted on a vehicle.

22. An apparatus, comprising:
a first antenna configured to receive a first signal;
a second antenna configured to receive a second signal;
an anti jamming anti-jammer manager configured to process the first signal and the second signal to obtain a residual signal, wherein to process the first signal and the second signal, the anti-jammer manager is configured to:
determine a weighting factor based at least in part on a correlation between the first signal and the second signal;
apply the weighting factor to the first signal to create a weighted first signal; and
subtract the weighted first signal from the second signal to obtain the residual signal;
a demodulator configured to demodulate the residual signal to obtain symbol information; and
a decoder configured to decode the symbol information to obtain data.

23. The apparatus of claim 22, further comprising:
a sub-band manager configured to spectrally split the first signal into a plurality of first signals and the second signal into a plurality of second signals according to a plurality of sub-bands, wherein:
the anti-jammer manager is further configured to determine respective weighting factors based at least in part on respective correlations between the plurality of first signals and the plurality of second signals;
the anti-jammer manager is further configured to apply the respective weighting factors to the plurality of first signals to create a plurality of weighted first signals;
the anti-jammer manager is further configured to subtract the plurality of weighted first signals from the plurality of second signals to obtain a plurality of residual signals; and
the demodulator is further configured to demodulate one or more of the plurality of residual signals.

24. The apparatus of claim 23, wherein a bandwidth of the plurality of sub-bands is based at least in part on one of a time of arrival of the first signal or the second signal and a distance between the first antenna and the second antenna.

25. The apparatus of claim 22, wherein the anti-jammer manager is further configured to:
detect a change in at least one of the first signal or the second signal; and update the weighting factor based at least in part on detecting the change.

26. The apparatus of claim 22, wherein the anti-jammer manager is further configured to:
compute an autocorrelation of the second signal and a cross correlation of the first signal and the second signal; and
determine the weighting factor based at least in part on a ratio of the autocorrelation of the second signal to the cross correlation.

27. The apparatus of claim 22, wherein the anti-jammer manager is further configured to:
process the first signal using an adaptive filter to create the weighted first signal, wherein a plurality of adaptive filter tap weights of the adaptive filter are tracked based on a minimization function of the residual signal.

28. The apparatus of claim 27, wherein the anti-jammer manager is further configured to:
input the second signal to a reference input of the adaptive filter.

29. The apparatus of claim 27, wherein the anti-jammer manager is further configured to;
determine, at a first time, to process the first signal using the adaptive filter based at least in part on a comparison of respective signal power levels of the first signal and the second signal.

30. The apparatus of claim 27, wherein:
the anti-jammer manager is further configured to:
determine, at a second time, to process the second signal using the adaptive filter to obtain a weighted second signal; and
subtract the weighted second signal from the first signal to obtain a second residual signal;
the demodulator is further configured to demodulate the second residual signal to obtain second symbol information; and
the decoder is further configured to decode the second symbol information to obtain second data.

31. The apparatus of claim 27, wherein the anti-jammer manager is further configured to:
freeze the plurality of adaptive filter tap weights during a transmit state or based at least in part on decoding to obtain the data.

32. The apparatus of claim 31, wherein the anti-jammer manager is further configured to:
saturate a tap weight update magnitude for the plurality of adaptive filter tap weights.

33. The apparatus of claim 31, wherein the anti-jammer manager is further configured to:
set a time constant of the adaptive filter to be greater than a duration of a preamble period, wherein the weighting factor is determined based at least in part on the time constant.

34. The apparatus of claim 22, further comprising:
a signal-to-noise ratio (SNR) manager to determine that an SNR of at least one of the first signal or the second signal is below a threshold SNR level at a first time or a received power of at least one of the first signal or the second signal satisfies a threshold received power level, wherein processing the first signal and the second signal to obtain the residual signal is based at least in part on determining that the SNR is below the threshold SNR level or the received power satisfies the threshold received power level.

35. The apparatus of claim 34, wherein:

the anti-jammer manager is further configured to:

determine, at a second time, that the SNR of at least one of the first signal or the second signal satisfies the threshold SNR level or that the received power does not satisfy the threshold received power level; and disable the processing of the first signal and the second signal to obtain the residual signal for the second time; and the demodulator is further configured to demodulate a third signal that is based at least in part on the first signal or the second signal for the second time.

36. The apparatus of claim 22, wherein the demodulator is further configured to:

enable the demodulating of the residual signal based at least in part on determining that the weighting factor satisfies a threshold.

37. An apparatus for wireless communication at a user equipment (UE), comprising:

a first antenna configured to receive a first signal;

a second antenna configured to receive a second signal;

a processor;

memory coupled with the processor; and instructions stored in the memory and executable by the processor to cause the apparatus to:

process the first signal and the second signal to obtain a residual signal, wherein the processing comprises to process the first signal and the second signal, the instructions are executable by the processor to cause the apparatus to:

determine a weighting factor based at least in part on a correlation between the first signal and the second signal;

apply the weighting factor to the first signal to create a weighted first signal;

subtract the weighted first signal from the second signal to obtain the residual signal;

demodulate the residual signal to obtain symbol information; and decode the symbol information to obtain data.

\* \* \* \* \*